United States Patent [19]
Iinuma

[11] Patent Number: 5,910,850
[45] Date of Patent: Jun. 8, 1999

[54] OPTIMIZATION BINARIZING CIRCUIT

[75] Inventor: Syunzi Iinuma, Yokohama, Japan

[73] Assignee: Kabushiki Kaisha Toshiba, Kawasaki, Japan

[21] Appl. No.: 08/313,771

[22] Filed: Sep. 28, 1994

[30] Foreign Application Priority Data

Sep. 30, 1993 [JP] Japan .................................... 5-245460

[51] Int. Cl.$^6$ .................................................. H04N 1/40
[52] U.S. Cl. ........................ 358/461; 358/448; 358/455; 358/466; 382/270; 382/274
[58] Field of Search ..................... 358/448, 455, 358/456, 458, 461, 465, 466, 443; 382/172, 270, 274

[56] References Cited

U.S. PATENT DOCUMENTS 5,138,671   8/1992   Yokoyama .............................. 382/172
5,307,425   4/1994   Otsuka .................................... 358/466

*Primary Examiner*—Thomas D. Lee
*Attorney, Agent, or Firm*—Cushman Darby & Cushman, IP Group of Pillsbury, Madison & Sutro LLP

[57] ABSTRACT

Disclosed herein is a binarizing circuit comprising a setting circuit for responding to changes in density of inputted image data based on a unique algorithm and for setting an optimal binarizing density level, a delay circuit for delaying the inputted image data for a predetermined time period and for outputting delayed image data, and a comparator for comparing the delayed image data supplied from the delay circuit with the binarizing density level set by the setting circuit and for generating optimal binarized image data in accordance with the changes in density of the inputted image data. When an image of a low contrast is read from an original, character portions of a low contrast can be reproduced, with background noise being eliminated to achieve excellent binarizing.

16 Claims, 6 Drawing Sheets

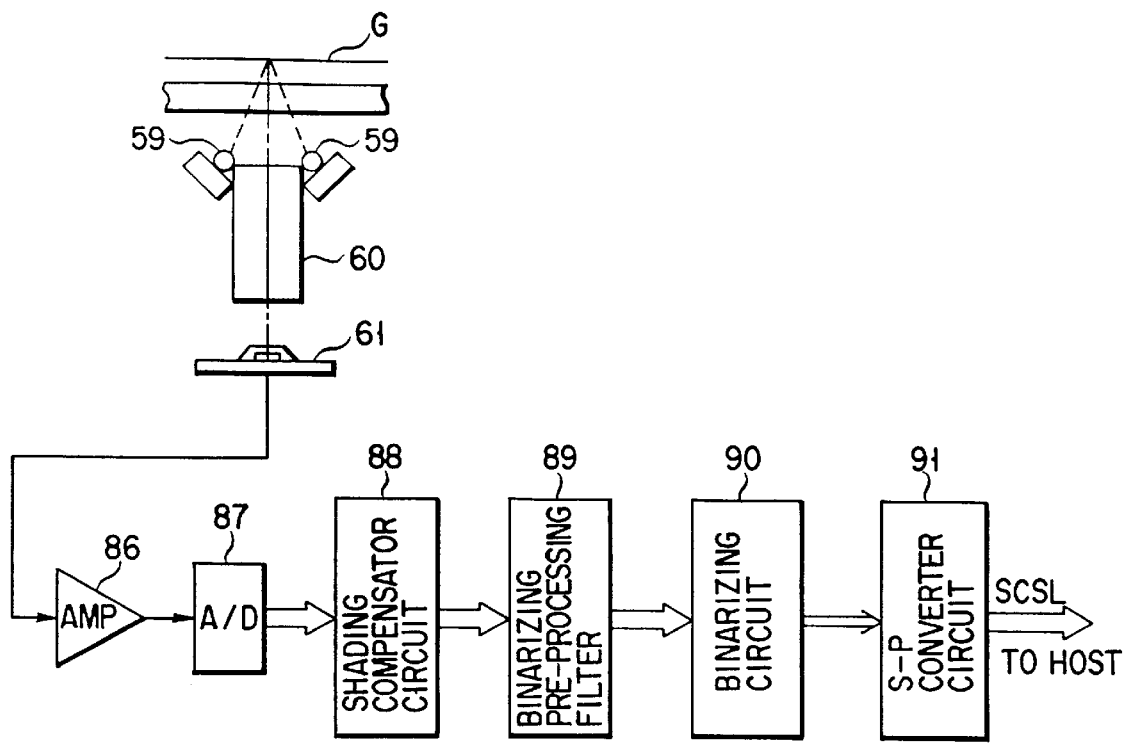
F I G. 2
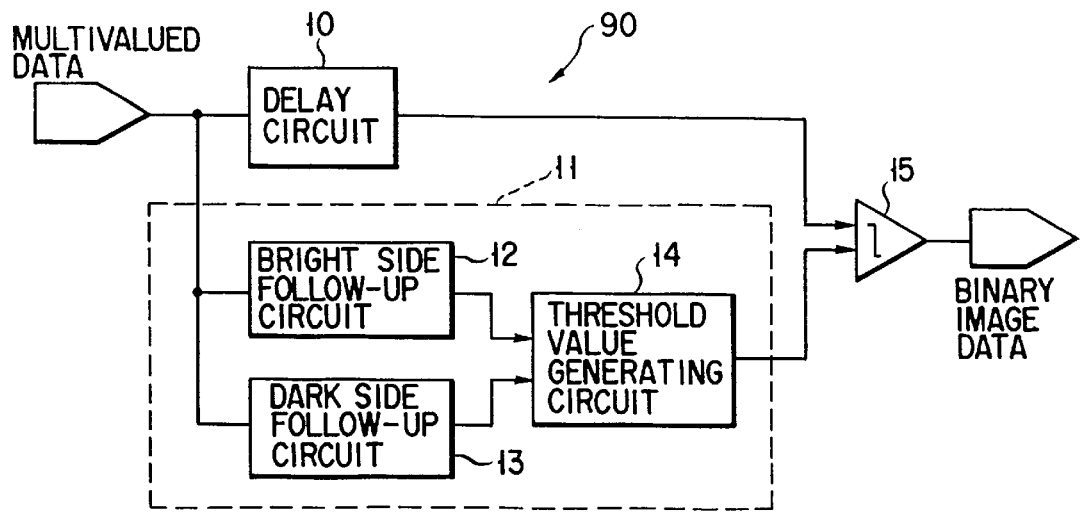
F I G. 3

| | BASIC OPERATION | FOLLOW-UP FORMULA |
|---|---|---|
| FIG. 5A | 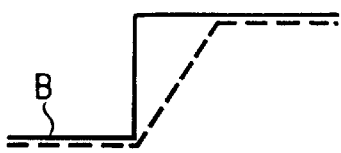 | $B + 2(X - X_0)$ |
| FIG. 5B | 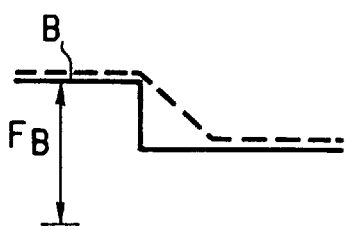 | $B - 2(X - X_0)$ |
| FIG. 5C | 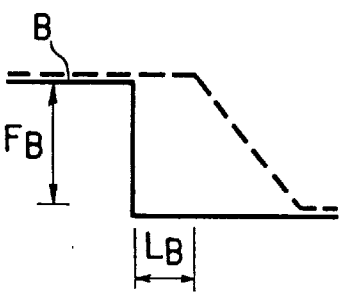 | |
| | BASIC OPERATION | FOLLOW-UP FORMULA |
|---|---|---|
| FIG. 6A | 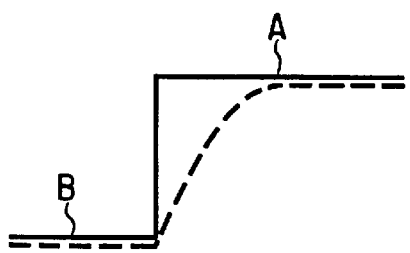 | $B + 0.15 * (A - B)(X - X_0)$ |
| FIG. 6B | 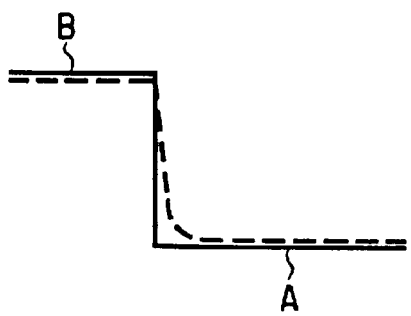 | $B - 0.7 * (B - A)(X - X_0)$ |

(1) $|B_H - B_V| < 20H$ : $(B_H + B_V)/2$
(2) $20H \leq |B_H - B_V| < 80H$ : BRIGHTER ONE OF $B_H$ AND $B_V$
(3) $80H \leq |B_H - B_V|$ : $|B_H - B_V| \times 2/3 +$
 (DARKER ONE OF $B_H$ AND $B_V$)

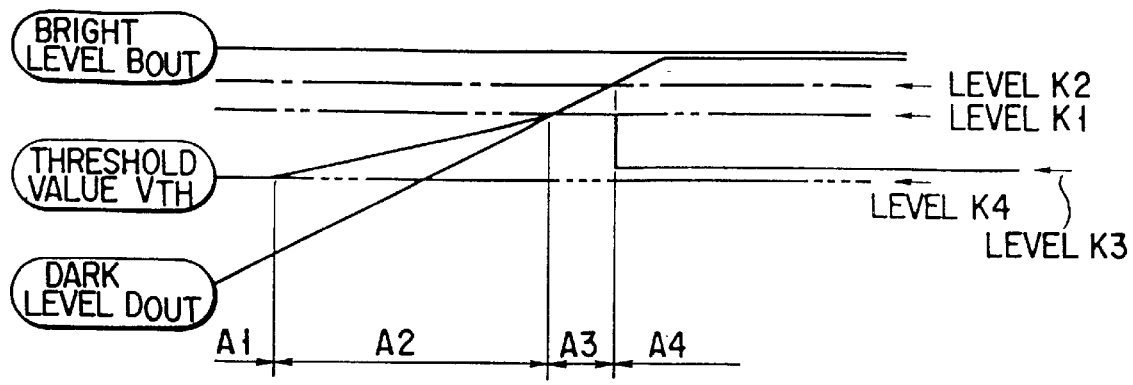
LEVEL K1: NOISE DETECTION LEVEL
LEVEL K2: ORIGINAL BACKGROUND LEVEL
LEVEL K3: THRESHOLD VALUE LEVEL AT LEVEL K2
LEVEL K4: THRESHOLD VALUE FOR ABSOLUTE BLACK
——— : THRESHOLD VALUE
F I G. 9
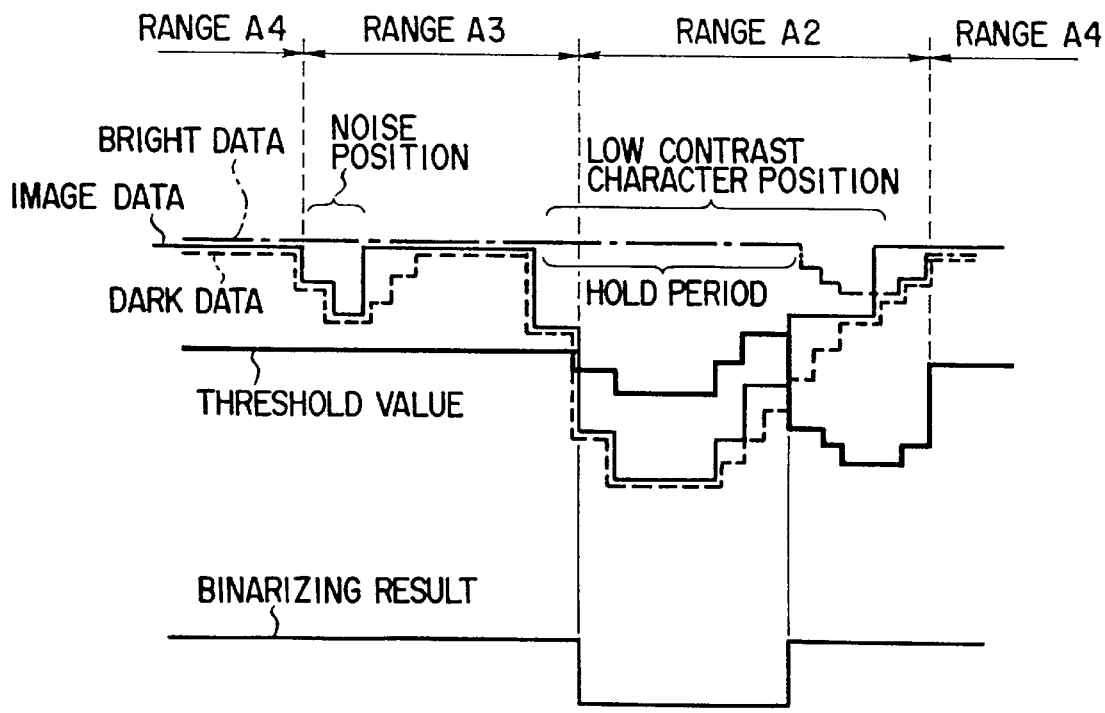
F I G. 10

5,910,850

OPTIMIZATION BINARIZING CIRCUIT

BACKGROUND OF THE INVENTION

1. Field of the Invention

The present invention relates to an image data processing apparatus for reading an original image, and particularly, to an optimization binarizing circuit which generates an optimal binarizing threshold value when an original image is converted into a binarized image.

2. Description of the Related Art

In a conventional data processing apparatus, e.g., a document image processing apparatus which processes code data and image data, image data which is read from an original by a scanner or the like and converted into multivalued data is converted into binarized data by means of a binarizing circuit using a fixed threshold value. A conventional binarizing threshold value is a constant value during a reading operation, that value being independent from conditions of an image formed on an original. The reading density is changed by simply increasing or decreasing the fixed threshold value. Specifically, the reading density is raised (or darkened) as the binarizing threshold value is increased, while the reading density is lowered (or lightened) as the binarizing threshold value is decreased.

In a binarizing circuit using a conventional fixed threshold value, when binarizing is carried out with a high binarizing threshold value, original data of a low contrast can be reproduced while the amount of background noise being concurrently read increases. Meanwhile, when binarizing is carried out with use of a low binarizing threshold value, original data of a low contrast is blurred while the amount of background noise being concurrently read in decreases. This is a problem with respect to a conventional circuit. Further, in a conventional binarizing circuit, while original data is read in, the binarizing threshold value is manually adjusted to an optimal value to reproduce an image portion of a low contrast and to simultaneously reduce backing noise. Specifically, the image density is adjusted by an operator based on the results of obtained by reading an original, so that the binarizing threshold value in the apparatus is changed and an image of an optimal density is obtained. This leads to another problem that adjustment of the binarizing threshold value requires a manual operation.

SUMMARY OF THE INVENTION

The present invention has been made to solve the above problems, and has as its object to provide an optimization binarizing circuit with which background noise can be eliminated and an original of a low contrast can be optimally reproduced.

In order to achieve the above object, according to first aspect of the present invention, there is provided a binarizing circuit comprising: bright side follow-up means for following up a density variation of inputted image data on a basis of a first algorithm, and outputting bright side follow-up data; dark side follow-up means for following up the density variation of the inputted image data on a basis of a second algorithm, and outputting dark side follow-up data; threshold generating means for generating an optimum threshold for the inputted image data from the bright side follow up data and the dark side follow up data, on a basis of a third algorithm; delaying means for delaying the inputted image data by a predetermined time, and outputting the delayed image data; and binarizing means for comparing the delayed image data from the delaying means and the threshold from the threshold generating means with each other, and binarizing the input image data.

According to the second aspect of the invention, there is provided an image binarizing apparatus comprising: means for inputting multi-value image data; first output means for outputting first data which varies in accordance with a high level variation of a density of the multi-value image data inputted from the input means; second output means for outputting second data which varies in accordance with a low level variation of the density of the multi-value image data inputted from the input means; revising means for successively revising a level of a threshold for binarizing the multi-value image data, on a basis of first and second data output from the first output means and the second output means; and binarizing means for binarizing the multi-value image data inputted from the input means, on a basis of the threshold value successively revised by the revising means.

In the present invention, to optimally binarizing image data, a binarizing threshold value is changed in accordance with the density level of an original image being read in. Specifically, bright data is generated by a follow-up circuit for a bright side level, depending on a background level of image data read from an original, while dark data is generated by another follow-up circuit for a dark side level, depending on an image data level of characters or the likes. When a predetermined difference in density exists between the density level of the bright data and that of the dark data, the binarizing threshold value is set to a middle density level between the bright level and the dark level.

When the density levels of the bright and dark data are close to each other so that the difference therebetween is within a predetermined range, it is determined that noise is being read in. In this case, the binarizing threshold value is held at a predetermined level, and the binarizing threshold value is therefore not changed. When the density levels of the bright and dark data are getting much closer to each other than in the above case, it is determined that the background is being read in and the binarizing threshold value is held at another predetermined level lower than the above predetermined level. Thus, character portions, background portions, and slight noise portions are distinguished from each other, so that an optimal binarizing threshold value is generated and an original of a low contrast is reproduced, obtaining excellent binarized data which includes less background noise.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a block diagram showing a configuration of an image data signal processing system in the image data processing apparatus of FIG. 1;

FIG. 3 is a block diagram showing a basic configuration of an optimization binarizing circuit according to the present invention;

FIGS. 5A to 5C are characteristic graphs showing dependency characteristics of a bright side follow-up circuit shown in FIG. 3;

FIGS. 6A and 6B are characteristic graphs showing dependency characteristics of a dark side follow-up circuit shown in FIG. 3;

FIG. 9 is a chart which explains an algorithm for generating a threshold value adopted in a threshold value generating circuit shown in FIG. 4; and FIG. 10 is a chart showing results of binarizing according to the present invention.

DETAILED DESCRIPTION OF THE PREFERRED EMBODIMENT

In the following, embodiments of the present invention will be explained with reference to the drawings.

Figure 1:
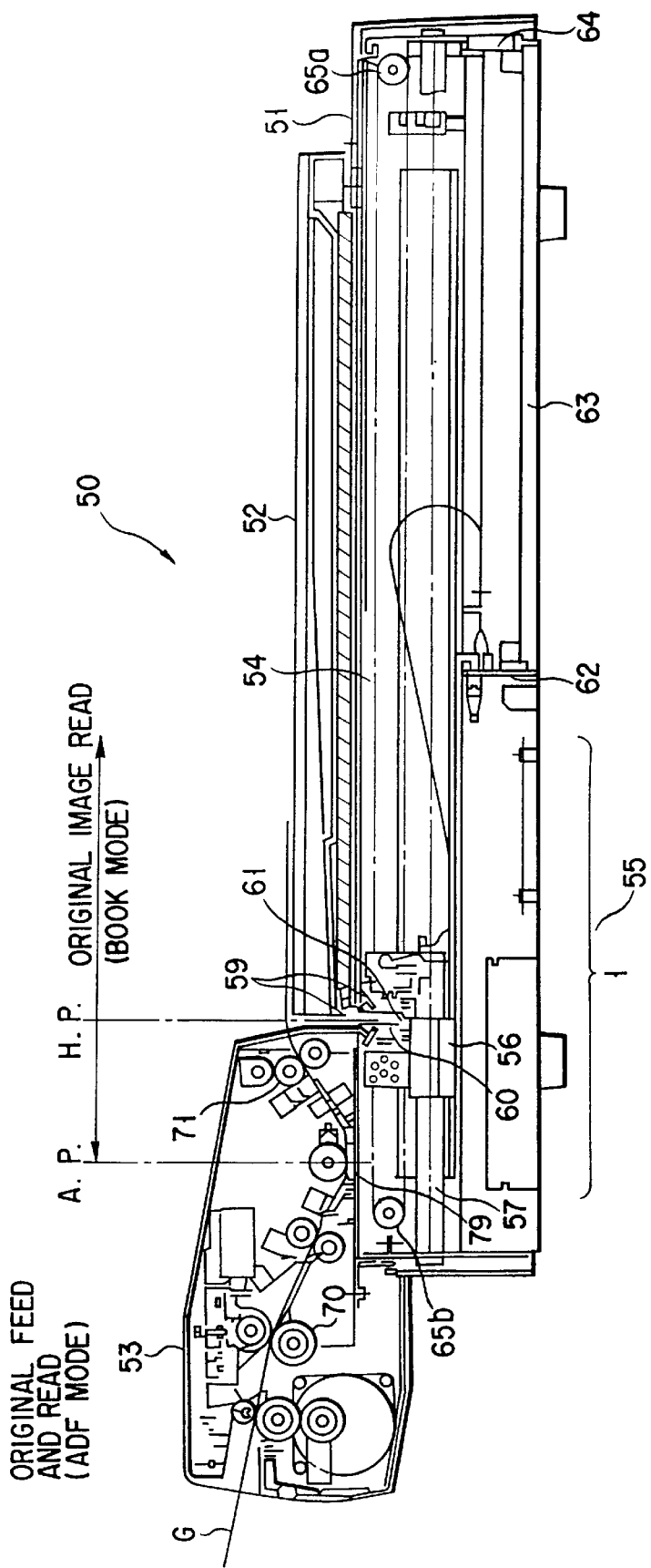
FIG. 1 is a cross-sectional view showing an image data processing apparatus which exemplarily adopts the present invention.

FIG. 1 is a cross-sectional view showing an image data processing apparatus which exemplarily adopts the present invention. The image data processing apparatus, e.g., an original reading apparatus 50 comprises a body 51, a cover 52, and an original automatic feed device 53. Reference 54 denotes a belt, and reference 55 denotes a power source and an electrical system portion. Reference 56 denotes a carriage (or an optical system) which is moved by the belt 54, and reference 57 denotes a carriage guide.

Light which is emitted from a light source 59 and reflected by an original G is guided by a rod lens 60 to a CCD 61 used as a reading apparatus. A mother board 62 is a substrate for transferring signals from the carriage 56 to a main board 63. The main board 63 is a CPU board for controlling the entire original reading apparatus, and carries out binarizing processing according to the present invention. An SCSI connector 64 is an interface connector connected with a host apparatus. References 65a and 65b denote belt support rollers.

Where the apparatus is operated in an original transfer reading mode (which will be referred to as an ADF mode hereinafter), the carriage 56 is moved and fixed to the position of A. P. by the belt 54. An original G is fed by a paper feed roller 70 of the original automatic feed device 53, and an image such as characters or the like are read from the original. Thereafter, the original is fed out by paired exhaust rollers 71. Meanwhile, in an original reading mode (which will be referred to as a Book mode), the cover 52 is opened and an original such as a book or the like, not shown, is mounted on a transparent glass table 79. As the carriage 56 is moved horizontally along the carriage guide 57, an image is read by the CCD 61.

FIG. 2 is a block diagram showing a configuration of an image data signal processing system in the image data processing apparatus of FIG. 1. Light beams emitted from the light source 59 consisting of a light emitting diode array are reflected by the original G. The light beams thus reflected are focused by the rod lens 60, and are converted into analog image signals by a photoelectric converter 61. These signals are amplified by an amplifier 86. The amplified signals are digital-converted by an A/D converter 87 into, for example, multivalued image data of a 256 level. Thereafter, light quantity distortion (shading) is compensated for, and smoothening, sharpening and the like are performed. The multivalued image data is converted into binarized data by a binarizing circuit 90, which is converted into parallel data by a serial/parallel converter 91 and is then outputted to a host apparatus through an SCSI.

FIG. 3 is a block diagram showing a basic configuration of the optimization binarizing circuit according to the present invention. The optimization binarizing circuit 90 consists of a delay circuit 10, an automatic density setting circuit 11, and a binarizing comparator 15. The automatic density setting circuit 11 consists of a bright side follow-up circuit 12, a dark side follow-up circuit 13, and a threshold value generating circuit 14. The automatic density setting circuit 11 outputs a binarizing threshold value used for generating an optimal binarized image corresponding to inputted image data.

The bright side follow-up circuit 12 generates bright side follow-up data close to the background level, in accordance with changes in density of inputted image data, as will be specifically explained below. The dark side follow-up circuit 13 generates dark side follow-up data close to an image level of lines, characters and the like, as will also be specifically explained below. The threshold value generating circuit 14 generates an optimal threshold value for inputted image data, on the basis of an algorithm described later, depending on the bright side follow-up data supplied from the bright side follow-up circuit 12 and the dark side follow-up data supplied from the dark side follow-up circuit 13.

The delay circuit 10 delays inputted image data for a processing time period required for generating an optimal binarizing threshold value in the automatic density setting circuit 11. Inputted image data is therefore compared with an optimal binarizing threshold value for the data at the same timing. As a result of this, for example, inputted multivalued data of a 256 level is converted into binarized image data by a binarizing comparator 15.

Figure 4:
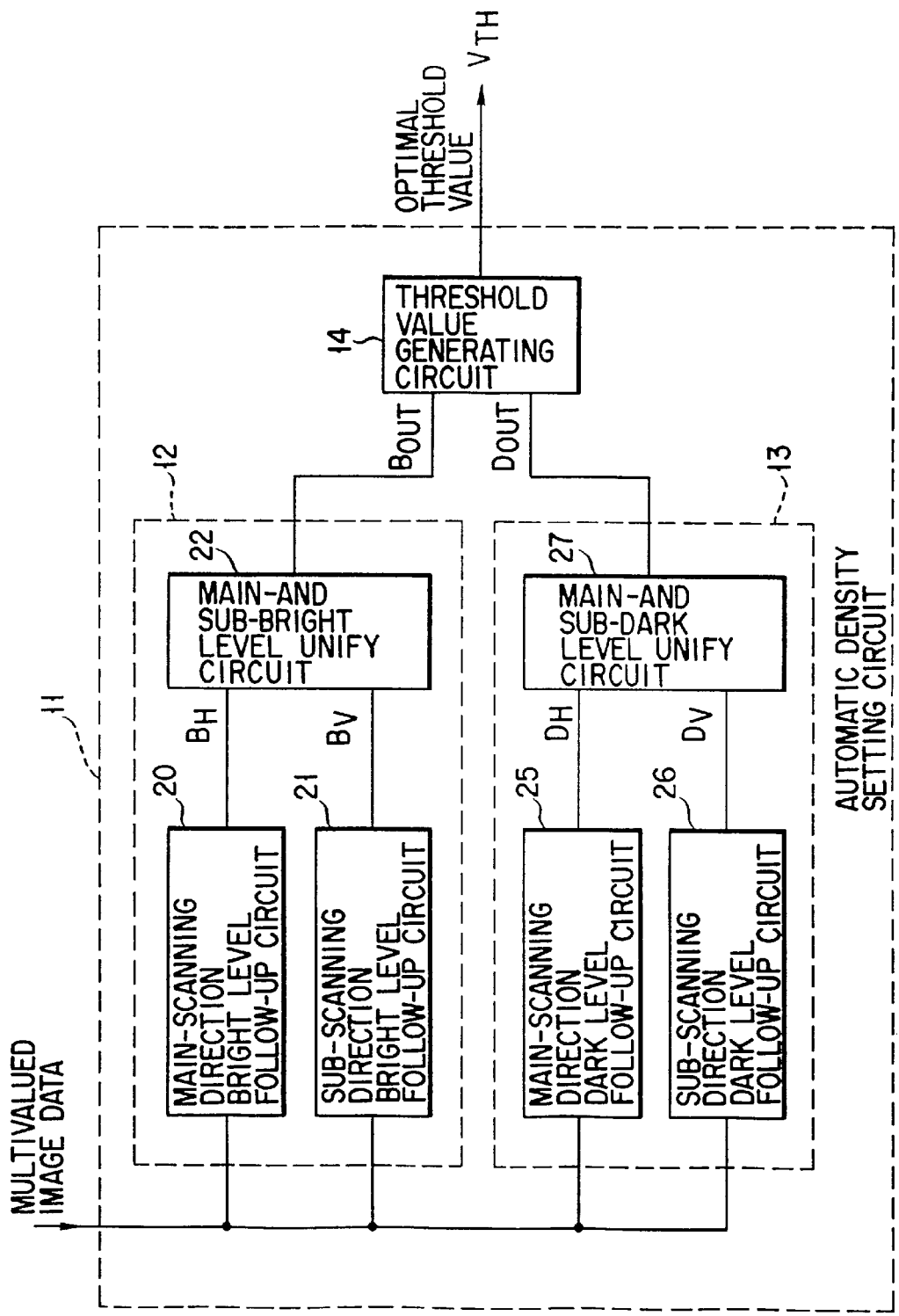
FIG. 4 is a block diagram showing a configuration of an automatic density setting circuit 11 shown in FIG. 3.

FIG. 4 is a block diagram showing the configuration of the automatic density setting circuit 11 shown in FIG. 3. The bright side follow-up circuit 12 consists of a main-scanning direction bright level follow-up circuit 20, a sub-scanning direction bright level follow-up circuit 21, and a main- and sub-bright level unify circuit 22. In general, the bright-side follow-up circuit 12 immediately responds to a rise of the density level of inputted image data by generating bright follow-up data. However, the bright-side follow-up circuit 12 slowly responds to a fall of the density level of the inputted image data by generating bright follow-up data. The main-scanning direction bright level follow-up circuit 20, for example, outputs bright level follow-up data $B_H$ in the horizontal direction of an original G. The sub-scanning direction bright level follow-up circuit 21, for example, outputs bright level follow-up data $B_V$ in the vertical direction of the original G.

The main-scanning direction bright level follow-up circuit 20 and the sub-scanning direction bright level follow-up circuit 21 carry out basic operations as shown in FIGS. 5A to 5C. Specifically, when inputted image data indicated by a continuous line in FIG. 5A starts up, bright follow-up data rises with a predetermined inclination as indicated by a dashed line shown in FIG. 5A. The follow-up formula thus indicated by the dashed line is obtained as follow, $$B+2(X-X_0)$$

where X represents a current pixel location and $X_0$ represents the location where the value of the pixel data begins to rise. Therefore, the bright follow-up data rises with an inclination which increases by "2" for every one pixel space from a density value B of inputted image data immediately before the inputted image data rise.

Further, as shown in FIG. 5B, where the inputted image data ends and a change in density of the inputted image data is smaller than a fall amplitude FB (e.g., a=20 HdB), the follow-up formula of the bright follow-up data indicated by the dashed line is obtained as follows:

$$B-2(X-X_0)$$

where X represents a current pixel location and $X_0$ represents the location where the value of the pixel data begins to fall. Therefore, the bright follow-up data rises with an inclination which decreases by "2" for every one pixel space from the density value B immediately before the inputted image data falls.

Further, as shown in FIG. 5C, when a change in density of the inputted image data is greater than a predetermined fall amplitude FB, the bright follow-up data indicated by a dashed line follows the inputted image data indicated by a continuous line in accordance with the follow-up formula described below, after the bright follow-up data indicated by the continuous line is held for a hold length LB (TB=10 H, e.g., 1 mm).

$$B-2(X-X_0-LB)$$

where X represents a current pixel location and $X_0$ represents the location where the value of the pixel data begins to fall. Where P is the number of pixels from a pixel whose hold period is over, to an observed pixel.

Meanwhile, the dark side follow-up circuit 13 consists of a main-scanning direction dark level follow-up circuit 25, a sub-scanning direction dark level follow-up circuit 26, and a main- and sub-bright level unify circuit 27. In general, the dark side follow-up circuit 13 slowly follows up a rise of the density level of inputted image data, and generates dark follow-up data. However, the dark side follow-up circuit 13 immediately follows up a fall of the density level of inputted image data, and generates dark follow-up data.

The main-scanning direction dark level follow-up circuit 25 outputs, for example, dark level follow-up data DH in the horizontal direction of an original, and the sub-scanning direction dark level follow-up circuit 26 outputs, for example, dark level follow-up data $D_V$ in the vertical direction of an original. Specifically, when the density level of inputted image data rises from a level B to a level A, as shown in FIG. 6A, both of the main-scanning direction dark level follow-up circuit 25 and the sub-scanning direction dark level follow-up circuit 26 output dark follow-up data in accordance with the follow-up formula described below in which a value obtained by multiplying a level change (A−B) by a constant 0.15 is added to an original level B:

$$B+0.15\times(A-B)(X-X_0)$$

where X represents a current pixel location and $X_0$ represents the location where the value of the pixel data begins to rise.

Further, as shown in FIG. 6B, when inputted image data falls, the main-scanning direction dark level follow-up circuit 25 and the sub-scanning direction dark level follow-up circuit 26 immediately output dark follow-up data in accordance with the follow-up formula described below:

$$B-0.7\times(B-A)(X-X_0)$$

where X represents a current pixel location and $X_0$ represents the location where the value of the pixel data begins to fall.

Figure 7:
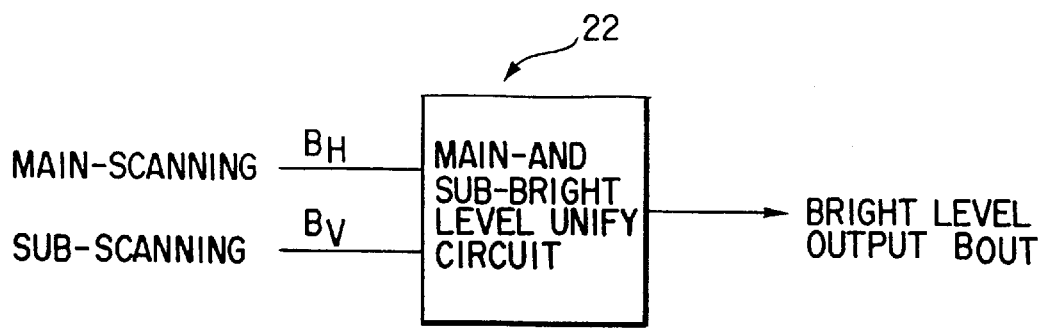
FIG. 7 is a diagram which explains bright output level setting of a circuit for unifying main and sub bright levels, shown in FIG. 4.

FIG. 7 is a diagram which explains bright level output Bout of the main- and sub-bright level unify circuit 22 shown in FIG. 4. In the main- and sub-bright level unify circuit 22, bright follow-up data $B_V$ supplied by the sub-scanning direction bright level follow-up circuit 21 is subtracted from the bright follow-up data $B_H$ supplied from the main-scanning direction bright level follow-up circuit 20, and a bright level output Bout is generated in correspondence with the absolute value |BH−BV|.

Specifically, when the level difference between the horizontal direction bright follow-up data $B_H$ and the vertical direction bright follow-up data $B_V$ is small and a formula of $|B_H-B_V|<20$ H is satisfied, an average value of the levels of the bright follow-up data $B_H$ and the bright follow-up data $B_V$ is outputted as a bright level output Bout, e.g., a level of 150 is outputted in case of using a 256 level. Further, when the level difference between the horizontal direction bright follow-up data $B_H$ and the vertical direction bright follow-up data $B_V$ is within a middle range and a formula of $|B_H-B_V|<80$ H is satisfied, data of the bright side is selected as a bright level output Bout, among the bright follow-up data $B_H$ and $B_V$. Meanwhile, when the level difference between the horizontal direction bright follow-up data $B_H$ and the vertical direction bright follow-up data $B_V$ is large and a formula of $80H \leq |B_H-B_V|$ is satisfied, the bright level output Bout is set to a value equivalent to ⅔ of the difference in density between the $B_H$ and $B_V$ levels, close to the bright side.

Figure 8:
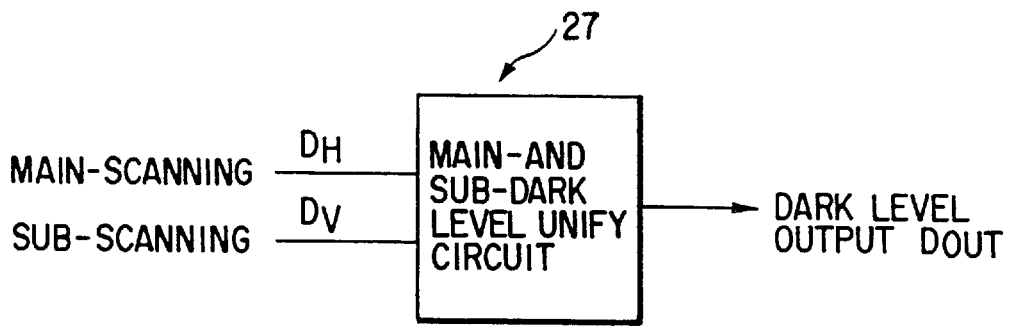
FIG. 8 is a diagram which explains dark output level setting of a circuit for unifying main and sub dark levels, shown in FIG. 4.

FIG. 8 is a diagram which explains the dark level output Dout of the main- and sub-dark level unify circuit 27 shown in FIG. 4. The main- and sub-dark level unify circuit 27 outputs, as a dark level output Dout, a smaller or darker one of dark follow-up data supplied from the main-scanning direction dark level follow-up circuit 25, e.g., the horizontal direction dark follow-up data $B_H$ of an original, and dark follow-up data supplied from the sub-scanning direction bright level follow-up circuit 26, e.g., the vertical direction dark follow-up data $B_V$.

FIG. 9 is a chart which explains the threshold value generating algorithm used in the threshold value generating circuit 14 of FIG. 4. The threshold value generating circuit 14 generates an optimal binarizing threshold value Vth in accordance with an algorithm described below, on the basis of the bright level output Bout and the dark level output Dout respectively generated from the main- and sub-bright level unify circuit 22 and the main- and sub-dark level unify circuit 27, both shown in FIG. 4.

In FIG. 9, the level K1 is a noise detection level for detecting noise included in image data, and is set to a value of 80% of a bright level output Bout, for example. The level K2 is a value set as a background level for eliminating background noise of an original, and is set to, for example, 94% of a bright level output Bout. The level K3 is a value set as a level of a threshold value corresponding to the level K2, and is set to, for example, 40% of a bright level Bout. The level K4 serves as a lower limiter for ensuring an absolute black, and is a threshold value for an absolute black level. The level K4 is set to, for example, a fixed value of 20 H (e.g., a level of 32 in case of using a level of 256).

In FIG. 9, an output vth of a threshold value generating circuit 14 is indicated (by a fat line) where the dark level output Dout changes as indicated (by a continuous line) with the bright level output (also indicated by a continuous line)

is kept constant, in order to simplify explanation. The range A1 defines a range in which the threshold value obtained by the before-mentioned formulas is equal to or lower than the level K4. In this case, the threshold value Vth is fixed to the level K4. Within the range A2, an optimization threshold value Vth is obtained by the following basic formula:

Vth=K3×(Bout−Dout)+Dout

The range A3 defines a range within which the threshold value is higher than the level K1 and lower than the level K2. In this case, the threshold value Vth is fixed to the level K1. The range A4 is a range within which the threshold value obtained by the above basic formula is higher than the level K2. In this case, the threshold value Vth is fixed to a value obtained by the following formula:

Bout×K3

FIG. 10 is a chart which explains operation of the present invention. In FIG. 10, a continuous line indicates image data, an alternate long and short dash line indicates a bright level output Bout, a dashed line indicates a dark level output Dout, and a fat line indicates an optimal threshold value Vth. As is apparent from FIG. 10, the bright level output Bout immediately responds to a rise of image data, while the output Bout responds to a fall of image data after a hold period LB. The dark level output Dout immediately follows up a fall of image data, while it slowly follows up a rise of image data with a predetermined time constant. The follow-up characteristic of the threshold value Vth can be controlled by setting a level difference between the bright level output Bout and the dark level output Dout, changing the hold period LB for which bright follow-up data is held, and/or changing constants and the like used in the follow-up formulas relating to the bright follow-up data $B_H$ and $B_V$ as well as the dark follow-up data $V_H$ and $V_B$.

In general, the width and amplitude of slight noise are both small. As shown in the range A3 of FIG. 10, even when inputted image data includes noise, the threshold value Vth is not influenced if the noise width is smaller than the hold period LB for the bright follow-up data. Further, even when the noise width is large, the threshold value Vth is not influenced if only the amplitude of noise is small, since noise having a small amplitude causes only a small level difference between the bright level output Bout and the dark level output Dout. As shown in binarizing results at the lower portion of FIG. 10, character portions of an original having a low contrast is reproduced as excellent binarized data, with noise portions being eliminated therefrom, when the threshold value is controlled in accordance with the present invention.

As has been explained above, according to the present invention, it is possible to provide an excellent binarized image which sufficiently reproduces character portions of a low contrast, with background noise being eliminated therefrom, when an original of a low contrast is read in. Further, regardless of image conditions an original to be read in, an optimal binarizing threshold value can be automatically generated and an image can be read in. Further, since slight noise can substantially be eliminated, a memory volume necessary for an image is reduced, so that the memory capacity of a recording medium can be small when image data is stored in a recording medium.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A binarizing circuit comprising:

bright side follow-up means for generating bright side follow-up data by applying a first follow-up formula to inputted image data when a density of the inputted image data rises, and by applying a second follow-up formula to the inputted image data when the density falls;

dark side follow-up means for generating dark side follow-up data by applying a third follow-up formula to the inputted image data when the density rises, and by applying a fourth follow-up formula to the inputted image data when the density falls;

threshold generating means for generating an optimum threshold for the inputted image data using a predetermined algorithm based on the bright side follow-up data and the dark side follow-up data;

delaying means for delaying the inputted image data by a predetermined time, and for outputting the delayed image data; and binarizing means for comparing the delayed image data output from the delaying means and the optimum threshold generated by the threshold generating means, and for binarizing the input image data based on the comparison.

2. A circuit according to claim 1, wherein said bright side follow-up means includes means for outputting bright side follow-up data based on the inputted image data by supplying said second follow-up formula after a predetermined holding time period when the density of the inputted image data falls more than a predetermined amount.

3. A circuit according to claim 1, wherein the first follow-up formula is expressed as

B+C(X−X$_0$), the second follow-up formula is expressed as

B−C(X−X$_0$), the third follow-up formula is expressed as

B+D1×(A−B)(X−X$_0$), and the fourth follow-up formula is expressed as

B−D2−(B−A)(X−X$_0$), wherein B represents a density of the inputted image data before the density is changed, A represents a density of the inputted image data after the density is changed, X represents a current pixel location, X$_0$ represents the pixel location where the density of the pixel data has changed, C, D1 and D2 are constants, and D1<D2.

4. A circuit according to claim 1, wherein a threshold VTH is set as follows by said predetermined algorithm employed by said threshold generating means, with respect to the following basic formula for VOUT:

VOUT=K3×(BOUT−DOUT)+DOUT,

VTH=K4, when VOUT≦K4;
VTH=VOUT, when K4<VOUT≦K1;
VTH=K1, when K1<VOUT≦K2; and
VTH=K3, when K2<VOUT;
where BOUT represents an output from the bright side follow up means, DOUT represents an output from the dark side follow up means, K1 represents a noise detection level, K2 represents an original background level, K3 represents a threshold level when the original background level is K2, and K4 represents a threshold for absolute black level.

5. A circuit for binarizing multi-value image data obtained by scanning an original image along a first direction and along a second direction normally crossing the first direction, comprising:

a first bright side follow-up circuit for generating first bright side follow-up data based on the image data by applying a first follow-up formula when a density level of the image data in the first scanning direction rises, and by applying a second follow-up formula when the density level of the image data in the first scanning direction falls, wherein application of the second follow-up formula is delayed until after a first predetermined holding time period when the density level falls more than a first predetermined value;

a second bright side follow-up circuit for outputting second bright side follow-up data based on the image data by applying the first follow-up formula when a density level of the image data in the second scanning direction rises, and by applying the second follow-up formula when the density level of the image data in the second scanning direction falls, wherein application of the second follow-up formula is delayed until after a second predetermined holding time period when the density level of the image data falls more than a second predetermined value;

a bright side unify circuit for generating bright side follow-up data by unifying the first bright side follow-up data and the second bright side follow-up data;

a first dark side follow-up circuit for outputting first dark side follow-up data based on the image data by applying a third follow-up formula when the density level of the image data in the first scanning direction rises, and by applying a fourth follow-up formula when the density level of the image data in the first scanning direction falls;

a second dark side follow-up circuit for outputting second dark side follow-up data based on the image data by applying the third follow-up formula when the density level of the image data in the second scanning direction rises, and by applying the fourth follow-up formula when the level of the image data in the second scanning direction falls;

a dark side unify circuit for generating dark side follow-up data by unifying the first dark side follow-up data and the second dark side follow-up data;

a threshold generating circuit for generating an optimal threshold for the image data based on a density level difference between the bright side follow-up data and the dark side follow-up data;

a delay circuit for delaying the inputted image data and for outputting the delayed image data; and a comparator circuit for converting the image data into binarized image data based on a comparison between the delayed image data from the delay circuit and the optimal threshold generated by the threshold generating circuit.

6. A circuit according to claim 5, wherein the bright side follow-up data unified by said bright side unifying circuit is $|BH-BV|/2$ when $|BH-BV|<A$, a value equal to a brighter one of BH and BV when $A \leq |BH-BV| < B$, and $|BH-BV|3/2 +$ (a value of a brighter one of BH and BV) when $B \leq |BH-BV|$, where BH is the first bright side follow-up data, BV is the second bright side follow-up data, and A and B are constants; and wherein the dark side follow-up data unified by the dark side unifying circuit is set to a value of a darker one of DH and DV, where DH represents the first dark side follow-up data and DV represents the second dark side follow-up data.

7. An image data processing apparatus comprising:

means for scanning an original in a first direction and a second direction and for generating image data corresponding to a second image of the original, the second direction being orthogonal to the first direction;

bright side follow-up means for generating bright side follow-up data by applying a first follow-up formula to inputted image data when a density of the inputted image data rises, and by applying a second follow-up formula to the inputted image data when the density falls;

dark side follow-up means for generating dark side follow-up data by applying a third follow-up formula to the inputted image data when the density rises, and by applying a fourth follow-up formula to the inputted image data when the density falls;

threshold generating means for generating an optimal threshold for the inputted image data using a predetermined algorithm based on the bright follow-up data and the dark side follow-up data;

delay means for delaying the inputted image data by a predetermined time, and for outputting the delayed image data; and binarizing means for binarizing the input image data by comparing the delayed image data from the delay means with the optimal threshold generated by the threshold generating means, and for outputting binarized image data based on the comparison.

8. An apparatus according to claim 7, wherein the bright side follow-up means includes means for generating bright side follow-up data based on the inputted image data by applying the follow-up formula after a predetermined holding time period when a level of the inputted image data falls more than a predetermined value.

9. An apparatus according to claim 7, wherein the bright side follow-up means includes:

a first bright side follow-up circuit for generating first bright side follow-up data based on the image data by applying the first follow-up formula when the density of the image data in the first scanning direction rises, and by applying the second follow-up formula when the density of the image data in the first scanning direction falls, wherein application of the second follow-up formula is delayed until after a first predetermined holding time period when the density of the image data falls more than a first predetermined value;

a second bright side follow-up circuit for outputting second bright side follow-up data based on the image data by applying the first follow-up formula when the density of the image data in the second scanning direction rises, and by applying the second follow-up formula when the density of the image data in the second scanning direction falls, wherein application of the second follow-up formula is delayed until after a first predetermined holding time period when the density of the image data falls more than a second predetermined value; and a bright side unify circuit for generating bright side follow-up data by unifying the first bright side follow-up data and the second bright side follow-up data; and wherein the dark side follow-up means includes:

a first dark side follow-up circuit for generating first dark side follow-up data based on the image data by applying the third follow-up formula when the density of the image data in the first scanning direction rises, and by applying the fourth follow-up formula when the density of the image data in the first scanning direction falls;

a second dark side follow-up circuit for generating second dark side follow-up data based on the image data by applying the third follow-up formula when the density of the image data in the second scanning direction rises, and by applying the fourth follow-up formula when the density of the image data in the second scanning direction falls; and a dark side unify circuit for outputting dark side follow-up data by unifying the first dark side follow-up data and the second dark side follow-up data.

10. A binarizing circuit comprising:

a bright side follow-up device for generating bright side follow-up data by applying a first follow-up formula to inputted image data when a density of the inputted image data rises, and by applying a second follow-up formula to the inputted image data when the density falls;

a dark side follow-up device for generating dark side follow-up data by applying a third follow-up formula to the inputted image data when the density rises, and by applying a fourth follow-up formula to the inputted image data when the density falls;

a threshold generator for generating an optimum threshold for the inputted image data using a predetermined algorithm based on the bright side follow-up data and the dark side follow-up data;

a delay unit for delaying the inputted image data by a predetermined time, and for outputting the delayed image data; and a binarizer for comparing the delayed image data output from the delay unit and the optimum threshold generated by the threshold generator, and for binarizing the input image data based on the comparison.

11. A circuit according to claim 10, wherein said bright side follow-up device includes a unit for outputting bright side follow-up data based on the inputted image data by supplying said second follow-up formula after a predetermined holding time period when the density of the inputted image data falls more than a predetermined amount.

12. A circuit according to claim 10, wherein the first follow-up formula is expressed as $$B+C(X-X_0),$$

the second follow-up formula is expressed as $$B-C(X-X_0),$$

the third follow-up formula is expressed as $$B+D1\times(A-B)(X-X_0),$$

and the fourth follow-up formula is expressed as $$B-D2\times(B-A)(X-X_0),$$

wherein B represents a density of the inputted image data before the density is changed, A represents a density of the inputted image data after the density is changed, X represents a current pixel location, $X_0$ represents the pixel location where the density of the pixel data has changed, C, D1 and D2 are constants, and D1<D2.

13. A circuit according to claim 10, wherein a threshold VTH is set by said predetermined algorithm employed by said threshold generator according to the following basic formula for VOUT:

$$VOUT=K3\times(BOUT-DOUT)+DOUT,$$

VTH=K4, when VOUT≦K4;

VTH=VOUT, when K4<VOUT≦K1;

VTH=K1, when K1<VOUT≦K2; and

VTH=K3, when K2<VOUT;

where BOUT represents an output from the bright side follow up means, DOUT represents an output from the dark side follow up means, K1 represents a noise detection level, K2 represents an original background level, K3 represents a threshold level when the original background level is K2, and K4 represents a threshold for absolute black level.

14. An image data processing apparatus comprising:

a scanner for scanning an original in a first direction and a second direction and for generating image data corresponding to a second image of the original, the second direction being orthogonal to the first direction;

a bright side follow-up device for generating bright side follow-up data by applying a first follow-up formula to inputted image data when a density of the inputted image data rises, and by applying a second follow-up formula to the inputted image data when the density falls;

a dark side follow-up device for generating dark side follow-up data by applying a third follow-up formula to the inputted image data when the density rises, and by applying a fourth follow-up formula to the inputted image data when the density falls;

a threshold generator for generating an optimal threshold for the inputted image data using a predetermined algorithm based on the bright follow-up data and the dark side follow-up data;

a delay unit for delaying the inputted image data by a predetermined time, and for outputting the delayed image data; and a binarizer for binarizing the input image data by comparing the delayed image data from the delay unit with the optimal threshold generated by the threshold generator, and for outputting binarized image data based on the comparison.

15. An apparatus according to claim 14, wherein the bright side follow-up device includes a unit for generating bright side follow-up data based on the inputted image data by applying the follow-up formula after a predetermined holding time period when a level of the inputted image data falls more than a predetermined value.

16. An apparatus according to claim 14, wherein the bright side follow-up device includes:
- a first bright side follow-up circuit for generating first bright side follow-up data based on the image data by applying the first follow-up formula when the density of the image data in the first scanning direction rises, and by applying the second follow-up formula when the density of the image data in the first scanning direction falls, wherein application of the second follow-up formula is delayed until after a first predetermined holding time period when the density of the image data falls more than a first predetermined value;
- a second bright side follow-up circuit for outputting second bright side follow-up data based on the image data by applying the first follow-up formula when the density of the image data in the second scanning direction rises, and by applying the second follow-up formula when the density of the image data in the second scanning direction falls, wherein application of the second follow-up formula is delayed until after a first predetermined holding time period when the density of the image data falls more than a second predetermined value; and
- a bright side unify circuit for generating bright side follow-up data by unifying the first bright side follow-up data and the second bright side follow-up data; and wherein the dark side follow-up device includes:
- a first dark side follow-up circuit for generating first dark side follow-up data based on the image data by applying the third follow-up formula when the density of the image data in the first scanning direction rises, and by applying the fourth follow-up formula when the density of the image data in the first scanning direction falls;
- a second dark side follow-up circuit for generating second dark side follow-up data based on the image data by applying the third follow-up formula when the density of the image data in the second scanning direction rises, and by applying the fourth follow-up formula when the density of the image data in the second scanning direction falls; and
- a dark side unify circuit for outputting dark side follow-up data by unifying the first dark side follow-up data and the second dark side follow-up data.

* * * * *